No. 641,515. Patented Jan. 16, 1900.
C. W. HUNT.
TIRE.
(Application filed Sept. 20, 1899.)
(No Model.)

Attest:
A. N. Jesbera
John M. Scolle

Inventor:
Charles W. Hunt
by Redding, Kiddle & Greeley
Attys.

UNITED STATES PATENT OFFICE.

CHARLES W. HUNT, OF NEW YORK, N. Y.

TIRE.

SPECIFICATION forming part of Letters Patent No. 641,515, dated January 16, 1900.

Application filed September 20, 1899. Serial No. 731,039. (No model.)

*To all whom it may concern:*

Be it known that I, CHARLES W. HUNT, a citizen of the United States, residing in the city of New York, (West New Brighton,) in the borough of Richmond, State of New York, have invented certain new and useful Improvements in Tires, of which the following is a specification, reference being had to the accompanying drawings, forming a part hereof.

This invention relates to yielding or cushion tires of the kind generally used for vehicles. Such tires are sometimes provided with a tread or shoe of metal or other material harder and possessed of greater wear-resisting qualities than the body of the tire; but hitherto it has been impossible to make such treads or shoes remain in place for any great length of time when the wheel is subjected to ordinary use.

It is the object of this invention to provide improved means for retaining the tread or shoe in place under all ordinary conditions of use, and in accordance with the invention the tire is expanded outwardly against the tread or shoe, so that the natural resilience of the tire tends always to retain the tread or shoe in position.

The invention is illustrated in the accompanying drawings as embodied in a convenient and practical form, to which reference will now be had for the purpose of explaining the nature of the invention more particularly.

Figure 1:
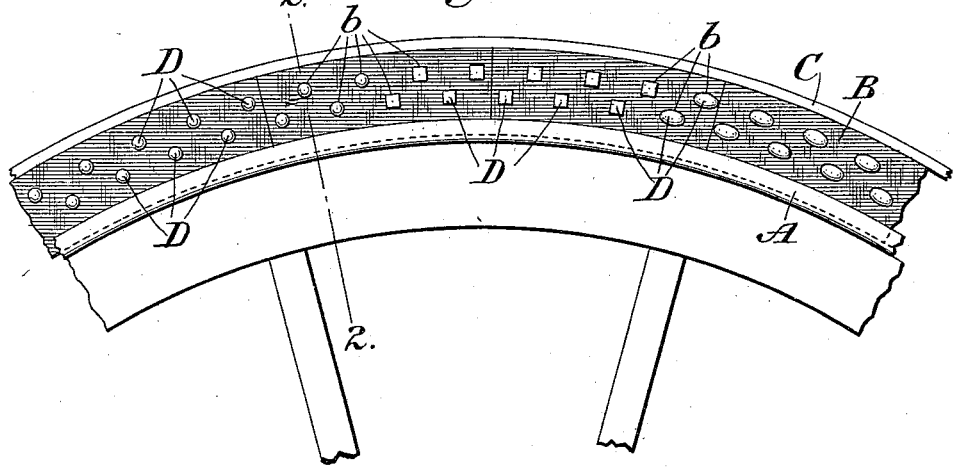
Figure 2:
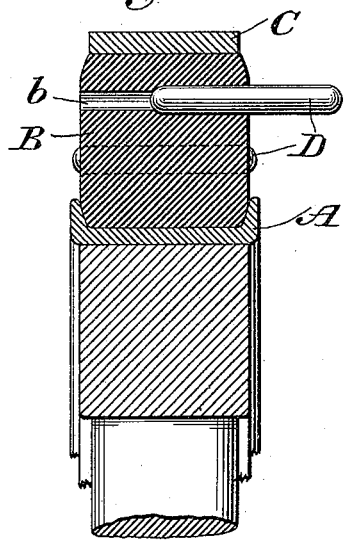

In the drawings, Figure 1 is a view in side elevation of a portion of a wheel to which the present improvement is applied; and Fig. 2 is a view in section on the plane indicated by the line 2 2 of Fig. 1, but on a larger scale, showing an expanding-pin partially inserted in the tire.

The wheel to which the invention is applied may be of any desired character. As represented in the drawings, however, the wheel is provided with a flanged rim A, which receives the yielding or cushion tire B, of rubber or other suitable material, and in one piece or sectional, as desired. A tread or shoe C, of any material calculated to resist wear, is applied to the peripheral surface of the tire and is held in place thereon by expanding the tire outwardly against the tread or shoe after the parts have been assembled. The expansion of the tire is most easily accomplished by forcing expanders or pins into the tire from the side. For convenience the tire is formed, during the process of manufacture, with holes $b\ b$, which may be of any suitable shape in cross-section and preferably extend through from side to side. When the tire and tread have been assembled on the wheel, pins, as shown at D in Fig. 2, are driven into the holes $b\ b$, the pins being sufficiently larger than the holes to expand the body of the tire outwardly against the tread or shoe.

It will be observed that in the improved construction the body of the tire by its own resilience presses firmly against the tread at all times, so that the latter is held securely and will not be displaced by any ordinary conditions of use.

I claim as my invention—

1. The combination with a wheel, of a yielding or cushion tire, a hard tread or shoe and expanders forced into said tire from the side to expand the same outwardly against the tread or shoe to hold the same in place.

2. The combination with a wheel, of a yielding or cushion tire, a hard tread or shoe and pins driven through the tire from side to side to expand the same outwardly against the tread or shoe to hold the same in place.

This specification signed and witnessed this 18th day of September, A. D. 1899.

CHARLES W. HUNT.

In presence of—
JOHN M. BLAKE,
A. N. JESBERA.